United States Patent
Hashizaka et al.

(10) Patent No.: US 9,403,446 B2
(45) Date of Patent: Aug. 2, 2016

(54) DRIVING-FORCE CONTROLLER FOR ELECTRIC VEHICLE

(71) Applicant: MITSUBISHI JIDOSHA KOGYO KABUSHIKI KAISHA, Tokyo (JP)

(72) Inventors: Akira Hashizaka, Tokyo (JP); Toshiyuki Matsumi, Tokyo (JP); Hiroaki Miyamoto, Tokyo (JP); Hideaki Taniguchi, Tokyo (JP); Takanori Sugimoto, Tokyo (JP); Masato Nishida, Tokyo (JP); Toshifumi Mizui, Tokyo (JP); Sosuke Nanbu, Tokyo (JP); Yasuyuki Hatsuda, Tokyo (JP); Tetsuya Furuichi, Tokyo (JP); Ryosuke Koga, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/723,155

(22) Filed: May 27, 2015

(65) Prior Publication Data
US 2015/0352978 A1 Dec. 10, 2015

(30) Foreign Application Priority Data

Jun. 4, 2014 (JP) ................................. 2014-115820
Jan. 26, 2015 (JP) ................................. 2015-012559

(51) Int. Cl.
*B60L 15/20* (2006.01)
*B60L 3/12* (2006.01)

(52) U.S. Cl.
CPC ............... *B60L 15/2036* (2013.01); *B60L 3/12* (2013.01); *B60L 2220/42* (2013.01); *B60L 2240/423* (2013.01); *Y02T 10/645* (2013.01); *Y02T 10/648* (2013.01); *Y02T 10/7275* (2013.01)

(58) Field of Classification Search
CPC ... B60L 15/2036; B60L 3/12; B60L 2220/42; B60L 2240/423
USPC ............................................................ 701/22
See application file for complete search history.

(56) References Cited

U.S. PATENT DOCUMENTS

| | | | | | |
|---|---|---|---|---|---|
| 5,453,930 A | * | 9/1995 | Imaseki | ................. | B60L 15/20 180/65.265 |
| 5,472,265 A | * | 12/1995 | Ohnuma | ................... | B60L 7/26 180/65.1 |

(Continued)

FOREIGN PATENT DOCUMENTS

JP 2008-222070 A 9/2008

OTHER PUBLICATIONS

Sakai et al., Motion Control in an Electric Vehicle with Four Independently Driven In-Wheel Motors, Mar. 1999, IEEE/ ASME Transactions on Mechatronics, vol. 4, No. 1, pp. 9-16.*

*Primary Examiner* — McDieunel Marc
*Assistant Examiner* — James E Stroud
(74) *Attorney, Agent, or Firm* — Birch, Stewart, Kolasch & Birch, LLP

(57) ABSTRACT

A driving-force controller for an electric vehicle including at least two motors that independently drive left and right wheels, includes a detector that detects driving operation by a driver, and a controller that calculates a demand torque Tr of the driver, the torque difference $\Delta T$ applied to the left and right wheels during cornering, left and right torque-difference maintaining torques $TL_K$ and $TR_K$ of the motors when generating the demand torque Tr while maintaining the torque difference $\Delta T$, and controls the motors based on the torque-difference maintaining torques $TL_K$ and $TR_K$. The controller determines the priorities of a demand torque mode that generates the demand torque Tr and a torque difference mode that generates the torque difference $\Delta T$ depending on the driving operation detected by the detector.

9 Claims, 5 Drawing Sheets

(56) References Cited

U.S. PATENT DOCUMENTS

| | | | | |
|---|---|---|---|---|
| 8,195,348 B2* | 6/2012 | Mizutani | ............... | B60K 1/02 180/65.265 |
| 2014/0135170 A1* | 5/2014 | Chess | ............... | B66F 9/07568 477/79 |
| 2014/0257613 A1* | 9/2014 | Tang | ............... | B60L 15/2036 701/22 |
| 2015/0251541 A1* | 9/2015 | Drako | ............... | B60L 3/106 701/22 |

* cited by examiner

DRIVING-FORCE CONTROLLER FOR ELECTRIC VEHICLE

CROSS-REFERENCE TO THE RELATED APPLICATION

This application incorporates by references the subject matter of Application No. 2014-115820 filed in Japan on Jun. 4, 2014 and Application No. 2015-012559 filed in Japan on Jan. 26, 2015 on which a priority claim is based under 35 U.S.C. §119(a).

FIELD

The present invention relates to a driving-force controller for an electric vehicle including motors that independently drive left and right wheels.

BACKGROUND

Electric vehicles have been known including motors that independently drive the left and right wheels, which each consist of at least one of forward and rearward wheels (refer to Japanese Unexamined Patent Application Publication No. 2008-222070). Such a driving system is referred to as twin-motor system or left-and-right-independent-drive system and has been drawing attention for its independent control of the driving forces (torques) applied to the left and right wheels, which improves kinematic performance. For example, a vehicle can generate a yaw moment during cornering through a difference between the driving forces (torque difference) applied to the left and right wheels in addition to the steering angle, so as to improve the cornering performance of the vehicle.

In the driving systems described above, the torque demanded by the driver (demand torque) is distributed and generated to the left and right motors. Thus, there is a problem which the torque difference generated by the left and right motors becomes smaller as the demand torque becomes larger. This is because, in general, the motors installed in the vehicle output the substantial maximum power when the demand torque is maximum. Thus, as the demand torque becomes larger, the margin of the motor output becomes smaller.

That is, depending on the operation by the driver, the driving systems described above can probably achieve a driver's request, but may nullify the torque difference between the left and right wheels during cornering. This interferes with the improvement of the cornering performance. On the other hand, the torque difference between the left and right wheels can be maintained through a decrease in the output of one of the left and right motors. In such a case, the decrease in the total output of the motors causes an insufficient response to a driver's request.

SUMMARY

Technical Problems

An object of the present invention, which has been accomplished to solve the above problems, is to provide a driving-force controller for an electric vehicle that can improve the cornering performance of the electric vehicle, while achieving a driver's request. In addition to the object described above, any other object of the present invention may be the achievement of advantages through the configuration of the embodiments of the present invention described below, which cannot be achieved by any traditional art.

Solution to Problems (1) The driving-force controller for an electric vehicle according to the present invention is provided in an electric vehicle that includes at least two motors that independently drive left and right wheels. The driving-force controller includes a detector that detects the driving operation by a driver. The driving-force controller includes a controller that calculates a demand torque of the driver and a torque difference applied to the left and right wheels during cornering, calculates left and right torque-difference maintaining torques of the motors when generating the demand torque while maintaining the torque difference, and controls the motors based on the torque-difference maintaining torques. The controller determines priorities of a demand torque mode that generates the demand torque and a torque difference mode that generates the torque difference depending on the driving operation detected by the detector.

(2) The detector preferably includes an accelerator position sensor that detects the stepping operation of an acceleration pedal as the driving operation. In such a case, the controller preferably acquires a degree of acceleration requirement of the driver based on the stepping operation of the accelerator pedal detected by the accelerator position sensor and determines the priorities depending on the degree of acceleration requirement.

(3) The controller preferably increases the priority of the demand torque mode as the degree of acceleration requirement becomes larger during cornering.

(4) The controller preferably increases the priority of the torque difference mode as the degree of acceleration requirement becomes smaller during cornering.

(5) The controller preferably selects the demand torque mode when the degree of acceleration requirement is equal to or larger than a predetermined value during cornering and selects the torque difference mode when the degree of acceleration requirement is smaller than the predetermined value during cornering.

(6) The controller preferably determines the priorities using a map previously setting therein a relationship between the driving operation by the driver and the torque difference of the left and right wheels, the torque difference being generatable during cornering.

(7) The controller preferably determines the priorities depending on the driving operation detected by the detector when a torque of the turning outer wheel, being one of the left and right torque-difference maintaining torques, exceeds a maximum output torque of the motors.

(8) The controller preferably sets an output torque from one of the motors of the turning outer wheel to a maximum output torque of the motors and determines an output torque from the other one of the motors of the turning inner wheel depending on the priorities, when a torque of the turning outer wheel, being one of the left and right torque-difference maintaining torques, exceeds the maximum output torque.

(9) The detector preferably includes an accelerator position sensor that detects the stepping operation of an acceleration pedal as the driving operation. In such a case, the controller preferably determines the priorities depending on the stepping operation acceleration of the acceleration pedal detected by the accelerator position sensor.

Advantageous Effects

The driving-force controller for an electric vehicle according to the present invention can improve the cornering performance of the electric vehicle while achieving a driver's request.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

Embodiments of the present invention will now be described with reference to the accompanying drawings. The embodiments described below are mere examples, and various modifications and technological applications that are not described in the embodiments should not be excluded from the scope of the invention. The configurations of the embodiments may be modified in various ways within the scope of the invention and may be selected and/or be combined appropriately.

1. First Embodiment 1-1. Device Configuration

The driving-force controller for an electric vehicle according to a first embodiment will now be described with reference to FIGS. 1 to 4.

Figure 1:
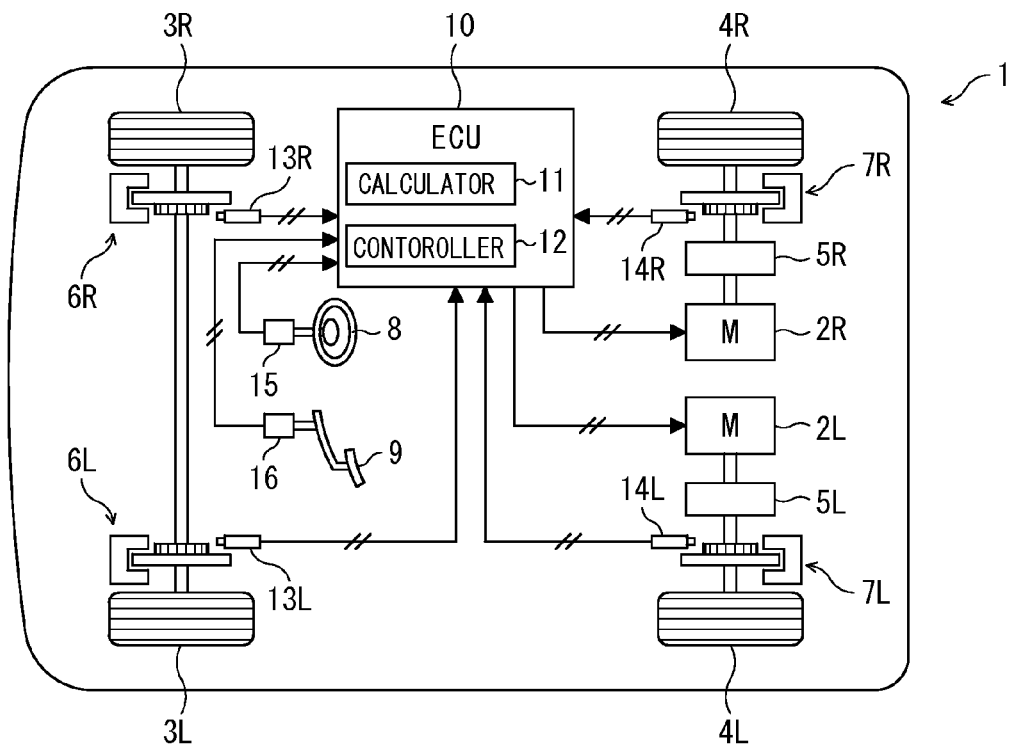
FIG. 1 is a schematic block diagram illustrating an overview of a driving-force controller for an electric vehicle according to a first embodiment.

FIG. 1 is a schematic block diagram illustrating the electric vehicle including the driving-force controller according to this embodiment.

With reference to FIG. 1, a vehicle 1 (electric vehicle) includes a left motor 2L that drives a left rear wheel 4L and a right motor 2R that drives a right rear wheel 4R. The vehicle 1 is a rear-wheel-independent-drive type electric vehicle that independently drives the left rear wheel 4L and the right rear wheel 4R. In this embodiment, the vehicle 1 is exemplified by a rear-wheel-independent-drive type electric vehicle. Alternatively, the vehicle 1 may be a front-wheel-independent-drive type electric vehicle that independently drives the left front wheel 3L and the right front wheel 3R. Hereinafter, the motors 2L and 2R, the front wheels 3L and 3R, and the rear wheels 4L and 4R will be simply referred to as motors 2, front wheels 3, and rear wheels 4, respectively, unless they should be differentiated.

The motors 2L and 2R are motor generators, such as three-phase synchronous motors or three-phase induction motors, which can operate in a powered mode and a regenerative mode and have identical output characteristics (driving-force characteristics) described below. The motors 2 are driven by electrical power supplied from a battery (not shown) via an inverter (not shown) that converts the DC power to AC power. The motors 2 are regeneratively driven by the rotation of the rear wheels 4 to generate electric power that can be stored in the battery.

Reducers 5L and 5R that reduce the rotational speed of the motors 2 are disposed on the axles connecting the motors 2 to the respective rear wheels 4. The front wheels 3L and 3R and the rear wheels 4L and 4R include brake units 6L and 6R and brake units 7L and 7R, respectively. The vehicle 1 also includes a brake controller (not shown) that controls the brake units 6L, 6R, 7L, and 7R and hydraulic units (not shown) in the braking system that independently supply hydraulic pressure to the brake units 6L, 6R, 7L, and 7R on the basis of instructions from the brake controller.

Wheel-speed sensors 13L and 13R and wheel-speed sensors 14L and 14R are respectively provided near the front wheels 3L and 3R and the rear wheels 4L and 4R to detect the wheel rotating speed. The vehicle 1 also includes a steering angle sensor 15 (detector) that detects the operation amount (driving operation) of a steering wheel 8 by the driver (hereinafter referred to as steering angle θ) and an accelerator position sensor 16 (detector) that detects the stepping operation amount (driving operation, stepping operation) of an accelerator pedal 9 by the driver (hereinafter referred to as accelerator position AP). The values (sensor values) detected by the wheel-speed sensors 13L, 13R, 14L, and 14R, the steering angle sensor 15, and the accelerator position sensor 16 are sent to an ECU 10 described below.

The steering angle θ corresponds to the operation direction of the steering wheel. A steering angle θ for turning the vehicle 1 to the right is positive, and a steering angle θ for turning the vehicle 1 to the left is negative. The accelerator position AP corresponds to the output (hereinafter referred to as demand torque Tr) required by the driver. That is, a large output required by the driver (the request of the driver to accelerate) increases accelerator position AP, whereas a small output required by the driver (the request of the driver to maintain constant speed or decelerate) decreases the accelerator position AP.

The vehicle 1 includes an electronic control unit (ECU) 10 (controller), which is, for example, a microprocessor, an LSI device having integrated ROMs and RAMs, or a built-in electronic device. The ECU 10 is an electronic controller that integrally controls the various devices equipped in the vehicle 1 and is connected to a communication line in an in-vehicle network provided in the vehicle 1. The driving-force control according to this embodiment performed during cornering of the vehicle 1 will now be described.

1-2. Control Configuration

Driving-force control is to determine priorities of two control modes depending on the driving operation by the driver during cornering, and to set output torques TL and TR of the motors 2L and 2R, respectively, depending on the priorities, and to drive the motors 2. The driving-force control has two control modes: a demand torque mode in which priority is given to the generation of the output required by the driver; and a torque difference mode in which priority is given to the generation of a difference ΔT (hereinafter referred to as torque difference ΔT) in the torques applied to the rear wheels 4L and 4R during cornering. In this embodiment, the stepping acceleration α (a second-order time differentiation value of the accelerator position AP) of the accelerator pedal 9 during cornering is used as the driving operation by the driver, and the steering angle θ is used the determination of the turning direction.

"Priority" refers to the degree (rate) of the priority. The priority affects "the rate of an actual target output (torque instruction value) to the output required by the driver" and "the rate of an actual torque difference of the left and right wheels to the torque difference ΔT optimal for the cornering." The priority can be expressed in percentage: for example, the demand torque mode is expressed by the priority of 30% and the torque difference mode is expressed by the priority of 70%.

The stepping acceleration α of the accelerator pedal 9 corresponds to the degree of acceleration required by the driver (degree of acceleration requirement). That is, when the degree of acceleration required by the driver is large, since the accelerator pedal 9 is swiftly stepped by the driver, the stepping acceleration α becomes large. When the degree of acceleration required by the driver is small, since the accelerator pedal 9 is slowly stepped by the driver, the stepping acceleration α becomes small.

A driving-force control according to this embodiment for determining the one of two control modes to the priority of either 0% or 100% and the other of two control modes to the priority of either 100% or 0% depending on the driving operation by the driver will now be described. That is, the driving-force control according to this embodiment selects one of the control modes set to the priority of 100% and then switches to the other control mode that is reset to the priority of 100%; i.e., the modes are switched depending on the driving operation by the driver.

The demand torque mode gives priority of the generation of the demand torque Tr by the motors 2L and 2R in response to the accelerator position AP during cornering over the generation of the torque difference ΔT. The demand torque mode is determined the priority of 100% when the stepping acceleration α is equal to or larger than a predetermined value $α_0$ (while the torque difference mode is determined the priority of 0%). That is, high stepping acceleration α of the accelerator pedal 9 stepped by the driver is interpreted as the intent of the driver to change the traveling direction of the vehicle 1 during acceleration (i.e., an increase in the driving force) regardless of spinning of the vehicle 1, and gives priority of the generation of the output required by the driver. In the demand torque mode, the motors 2 are controlled such that a total torque Tt of the output torque TL from the left motor 2L and the output torque TR from the right motor 2R equals the demand torque Tr. In the demand torque mode, the difference between the output torques TL and TR may be smaller than the torque difference ΔT.

The torque difference mode gives priority of the generation of an ideal torque difference ΔT generated by the motors 2L and 2R to maintain high stability during cornering over the generation of the demand torque Tr. The torque difference mode is determined the priority of 100% when the stepping acceleration α is smaller than the predetermined value $α_0$ (while the demand torque mode is determined the priority of 0%). That is, low stepping acceleration α of the accelerator pedal 9 stepped by the driver is interpreted as the intent of the driver to pass through a curve at the current vehicle speed (no intent of intense acceleration) and gives priority of the generation of an ideal torque difference ΔT. In the torque difference mode, the motors 2 are controlled such that the output torque transmitted from the motor 2 to the turning outer wheel is greater by the torque difference ΔT than the output torque transmitted from the motor 2 to the turning inner wheel. In the torque difference mode, the total torque Tt of the output torques TL and TR may be smaller than the demand torque Tr.

Figure 2:
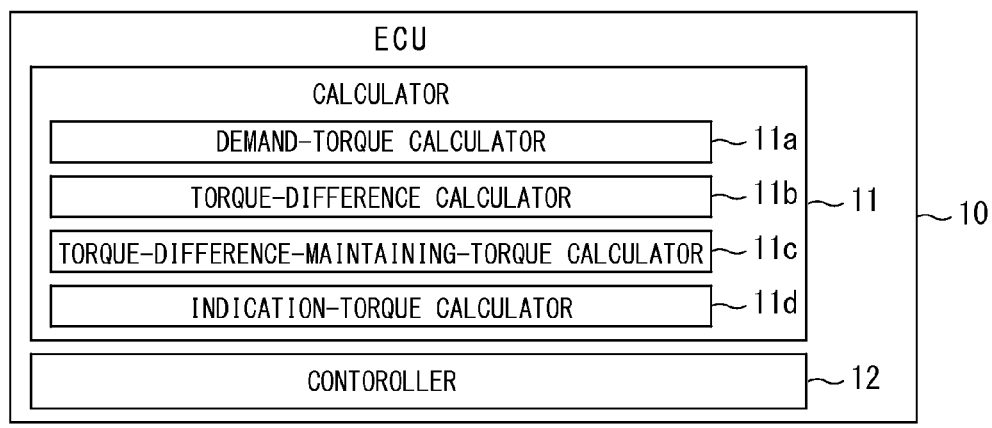
FIG. 2 is a block diagram illustrating the ECU in FIG. 1.

With reference to FIGS. 1 and 2, the ECU 10 includes functional components for carrying out the driving-force control described above, i.e., a calculator 11 (computing unit) and a controller 12 (control unit). The calculator 11 includes a demand-torque calculator 11a, a torque-difference calculator 11b, a torque-difference-maintaining-torque calculator 11c, and an indication-torque calculator 11d. These components may be provided as electronic circuits (hardware) or software programs. Alternatively, part of the functions may be provided as hardware while the other functions provided as software.

The demand-torque calculator 11a calculates the demand torque Tr corresponding to the stepping operation amount (accelerator position AP) of the accelerator pedal 9 stepped by the driver and is constantly in a calculation mode when the ECU 10 is turned on regardless of the cornering of the vehicle 1. The demand-torque calculator 11a acquires the demand torque Tr corresponding to the accelerator position AP detected by the accelerator position sensor 16 using the map illustrated in FIG. 3A. The demand-torque calculator 11a sends the calculated demand torque Tr to the torque-difference-maintaining-torque calculator 11c and the indication-torque calculator 11d.

Figure 3A:
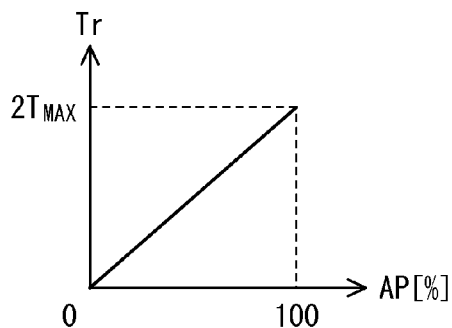
FIG. 3A is an example map for acquiring the demand torque.
Figure 3B:
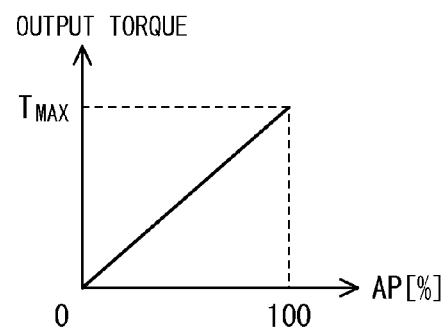
FIG. 3B is an example map illustrating the output characteristics of motors of the driving-force controller according to the first embodiment.

FIG. 3B illustrates the output characteristics of the motors 2L and 2R according to this embodiment. With reference to FIG. 3B, each output of the motors 2L and 2R according to this embodiment linearly increases as the accelerator position AP increases. That is, in the output characteristics of the motors 2L and 2R, zero torque is output at the accelerator position AP of 0% and maximum output torques $TL_{MAX}$ and $TR_{MAX}$ are output at the accelerator position AP of 100%. The maximum output torques $TL_{MAX}$ and $TR_{MAX}$ of the respective motors 2L and 2R are identical. Thus, hereinafter maximum output torques $TL_{MAX}$ and $TR_{MAX}$ are simply referred to as maximum output torque $T_{MAX}$.

The torque-difference calculator 11b calculates the ideal torque difference ΔT during cornering that enables stable cornering. The torque-difference calculator 11b calculates the torque difference ΔT, for example, on the basis of the steering angle θ detected by the steering angle sensor 15 and a vehicle speed V calculated from the wheel rotating speeds detected by the wheel-speed sensors 13L, 13R, 14L, and 14R. The torque-difference calculator 11b sends the calculated torque difference ΔT to the torque-difference-maintaining-torque calculator 11c.

The torque-difference-maintaining-torque calculator 11c calculates the torques to be output from the motors 2L and 2R when generating the demand torque Tr calculated by the demand-torque calculator 11a while maintaining the torque difference ΔT calculated by the torque-difference calculator 11b (hereinafter these torques are referred to as torque-difference maintaining torques $TL_K$ and $TR_K$). The torque-difference-maintaining-torque calculator 11c sends the calculated torque-difference maintaining torques $TL_K$ and $TR_K$ to the indication-torque calculator 11d.

For example, in clockwise turning of the vehicle 1, the left rear wheel 4L is the turning outer wheel and the right rear wheel 4R is the turning inner wheel. Thus, the torque-difference maintaining torque $TL_K$ generated in the left motor 2L can be represented by Expression (1a), and the torque-difference maintaining torque $TR_K$ generated in the right motor 2R can be represented by Expression (1b). In counterclockwise turning, the torque-difference maintaining torques $TL_K$ and $TR_K$ are reversed. That is, in the counterclockwise turning of the vehicle 1, the torque-difference maintaining torque $TL_K$ generated in the left motor 2L is represented by the right side of Expression (1b), and the torque-difference maintaining torque $TR_K$ generated in the right motor 2R is represented by the right side of Expression (1a).

Expression 1

$$TL_K = \frac{Tr}{2} + \frac{\Delta T}{2}, \quad (1a)$$

$$TR_K = \frac{Tr}{2} - \frac{\Delta T}{2} \quad (1b)$$

The indication-torque calculator 11d calculates the output torques TL and TR (torque instruction values) instructing the motors 2L and 2R depending on the torque-difference maintaining torques $TL_K$ and $TR_K$, the stepping acceleration $\alpha$, and the steering angle $\theta$ and sets the output torques TL and TR. The output torques TL and TR set by the indication-torque calculator 11d are sent to the controller 12. The indication-torque calculator 11d compares the maximum output torque $T_{MAX}$ of the motors 2 with the torque $Tout_K$, which is the larger one of the torque-difference maintaining torques $TL_K$ and $TR_K$ calculated by the torque-difference-maintaining-torque calculator 11c (the torque-difference maintaining torque of the turning outer wheel).

If the torque-difference maintaining torque $Tout_K$ of the turning outer wheel is less than or equal to the maximum output torque $T_{MAX}$, the torque-difference maintaining torques $TL_K$ and $TR_K$ can be generated by the motors 2L and 2R, respectively. In this case, the demand torque Tr can be achieved with the torque difference $\Delta T$ generated by the motors 2L and 2R. Thus, the indication-torque calculator 11d sets the respective output torques TL and TR to the torque-difference maintaining torques $TL_K$ and $TR_K$ ($TL=TL_K$, $TR=TR_K$).

If the torque-difference maintaining torque $Tout_K$ of the turning outer wheel exceeds the maximum output torque $T_{MAX}$, the torque $Tout_K$ cannot be generated by the motors 2. In such a case, the indication-torque calculator 11d subtracts the maximum output torque $T_{MAX}$ from the torque $Tout_K$ to calculate the excess D over the maximum output torque $T_{MAX}$ ($D=Tout_K-T_{MAX}$). The turning direction is determined based on positive and negative of the steering angle $\theta$, and the output torque from the motor 2 of the turning outer wheel is set to the maximum output torque $T_{MAX}$ of the motors 2 (i.e., the value obtained by subtracting the excess D from the torque-difference maintaining torque $Tout_K$ of the turning outer wheel).

The indication-torque calculator 11d calculates the second-order time differentiation value of the accelerator position AP to obtain the stepping acceleration $\alpha$, determines the priorities of the two control modes depending on the stepping acceleration $\alpha$, and sets the output torque from the motor 2 of the turning inner wheel based on the determined priorities. In this embodiment, when the stepping acceleration $\alpha$ is equal to or larger than the predetermined value $\alpha_0$, the demand torque mode is determined the priority of 100% and the torque difference mode is determined the priority of 0%. When the stepping acceleration $\alpha$ is smaller than the predetermined value $\alpha_0$, the demand torque mode is determined the priority of 0% and the torque difference mode is determined the priority of 100%. The predetermined value $\alpha_0$ is a threshold to determine the degree of acceleration requirement of the driver (acceleration intent) during cornering and may be a preset value or may be set to any value in advance by the driver.

If the priority of the demand torque mode is 100%, the indication-torque calculator 11d sets the output torque of the turning inner wheel to the sum of the corresponding torque-difference maintaining torque and the excess D. That is, the output torque of the turning inner wheel is set to the sum of the smaller one of the torque-difference maintaining torques $TL_K$ and $TR_K$ and the difference obtained by subtracting the maximum output torque $T_{MAX}$ from the torque-difference maintaining torque $Tout_K$ of the turning outer wheel. Such setting generates the demand torque Tr by the motors 2L and 2R and approximates, as much as possible, the torque difference $\Delta T$ to the difference between the output torques TL and TR.

For example, if the priority of the demand torque mode is 100% in the clockwise turning, the indication-torque calculator 11d sets the output torque TL from the left motor 2L to the maximum output torque $T_{MAX}$ (the difference obtained by subtracting the excess D from the left torque-difference maintaining torque $TL_K$ ($TL=TL_K-D=T_{MAX}$)) and the output torque TR from the right motor 2R to the sum of the right torque-difference maintaining torque $TR_K$ and the excess D ($TR=TR_K+D$). In contrast, in the counterclockwise turning, the output torque TR from the right motor 2R is set to the maximum output torque $T_{MAX}$ (the difference obtained by subtracting the excess D from the right torque-difference maintaining torque $TR_K$ ($TR=TR_K-D=T_{MAX}$)), and the output torque TL from the left motor 2L is set to the sum of the left torque-difference maintaining torque $TL_K$ and the excess D ($TL=TL_K+D$).

By such setting of the output torques TL and TR, the total torque Tt is not changed. Consequently, the motors 2L and 2R can generate the demand torque Tr. Although the difference between the output torques TL and TR is smaller than the ideal torque difference $\Delta T$, the difference between the torques TL and TR can be maximized by setting the output torque of turning outer wheel to the maximum output torque $T_{MAX}$.

On the other hand, if the priority of the torque difference mode is 100%, the indication-torque calculator 11d sets the output torque of the turning inner wheel to the difference obtained by subtracting the excess D from the corresponding torque-difference maintaining torque (i.e., the smaller one of the torque-difference maintaining torques $TL_K$ and $TR_K$). That is, in the torque difference mode, the output torques TL and TR are set to the differences obtained by subtracting the excess D from the respective torque-difference maintaining torques $TL_K$ and $TR_K$ ($TL=TL_K-D$, $TR=TR_K-D$), regardless of the turning direction. In this way, the output torques TL and TR are set while keeping the torque difference $\Delta T$ between the torque-difference maintaining torques $TL_K$ and $TR_K$. In the torque difference mode, the output torque of the turning outer wheel is set to the maximum output torque $T_{MAX}$, and thus the total torque Tt can approximate the demand torque Tr as much as possible.

If the steering angle $\theta$ detected by the steering angle sensor 15 is less than or equal to a predetermined steering angle $\theta_0$, the indication-torque calculator 11d determines a non-cornering mode. Then, the indication-torque calculator 11d sets each of the output torques TL and TR to half of the demand torque Tr calculated by the demand-torque calculator 11a (TL=TR=Tr/2). The predetermined steering angle $\theta_0$ is a threshold to determine a variation in the traveling direction of the vehicle 1 and may be a preset value approximating zero or a value set depending on the speed and acceleration of the vehicle.

The controller 12 controls the motors 2L and 2R by instructing them to generate the output torques TL and TR set by the indication-torque calculator 11d.

1-3. Flow Chart

Figure 4:
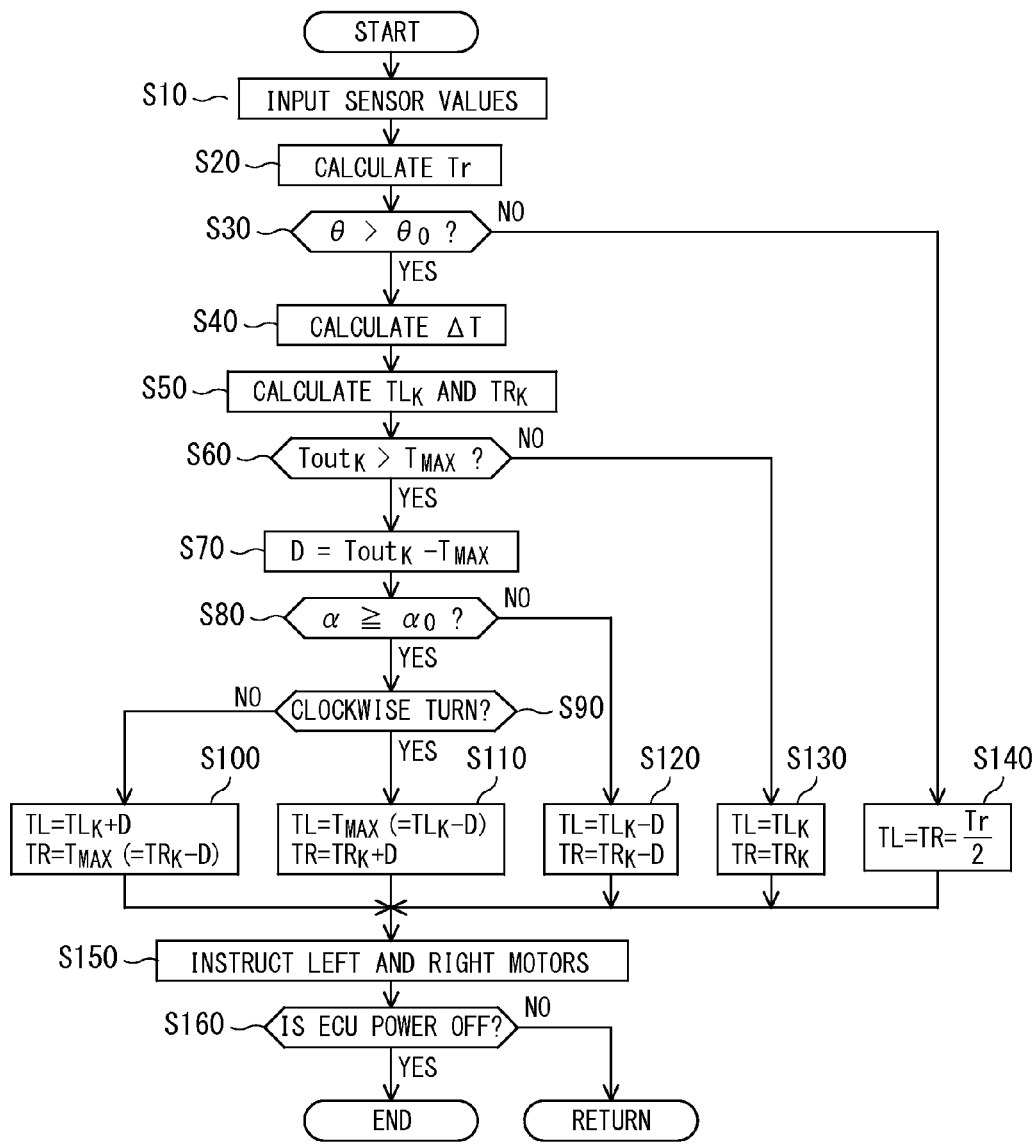
FIG. 4 is a flow chart illustrating the control process carried out by the driving-force controller according to the first embodiment.

FIG. 4 is a flow chart illustrating the process of driving-force control. The process in the flow chart is repeated at a predetermined calculation cycle while the ECU 10 is turned on.

With reference to FIG. 4, in Step S10, the data items detected by the sensors 13 to 16 are input to the ECU 10. In Step S20, the demand-torque calculator 11a calculates the demand torque Tr. In Step S30, the steering angle $\theta$ is determined whether to be larger than the predetermined steering angle $\theta_0$.

If $\theta \leq \theta_0$, the vehicle 1 is not cornering. Thus, the process goes to Step S140. In Step S140, the indication-torque calculator 11d sets each of the output torques TL and TR to half of the demand torque Tr. If $\theta > \theta_0$, the torque-difference calculator 11b calculates the torque difference $\Delta T$ in Step S40. In Step S50, the torque-difference-maintaining-torque calculator 11c calculates the torque-difference maintaining torques $TL_K$ and $TR_K$.

Step S60 and the subsequent steps are performed by the indication-torque calculator 11d. In Step S60, the torque-difference maintaining torque $Tout_K$ of the turning outer wheel is determined whether to be larger than the maximum output torque $T_{MAX}$. If $Tout_K \leq T_{MAX}$, the torque-difference maintaining torques $TL_K$ and $TR_K$ can both be generated. Thus, the process goes to Step S130 to set the respective output torques TL and TR to the torque-difference maintaining torques $TL_K$ and $TR_K$ calculated in Step S50.

If $Tout_K > T_{MAX}$, the excess D is calculated in Step S70. In Step S80, the stepping acceleration $\alpha$ calculated from the accelerator position AP is determined whether to be equal to or larger than the predetermined value $\alpha_0$. If $\alpha < \alpha_0$, the torque difference mode is determined to the priority of 100%, and the process goes to Step S120. In Step S120, the respective output torques TL and TR are set to the differences obtained by subtracting the excess D calculated in Step S70 from the respective torque-difference maintaining torques $TL_K$ and $TR_K$ calculated in Step S50.

If $\alpha \geq \alpha_0$, the priority of 100% is determined to the demand torque mode, and the turning direction is determined from the steering angle $\theta$. In Step S90, the turning is determined whether to be the clockwise turn. If the clockwise turning, in Step S110, the output torque TL from the left motor 2L of the turning outer wheel is set to the maximum output torque $T_{MAX}$ of the motors 2 (i.e., the difference obtained by subtracting the excess D from the left torque-difference maintaining torques $TL_K$), and the output torque TR from the right motor 2R of the turning inner wheel is set to the sum of the right torque-difference maintaining torques $TR_K$ and the excess D. If the counterclockwise turning, in Step S100, the output torque TR from the right motor 2R of the turning outer wheel is set to the maximum output torque $T_{MAX}$ of the motors 2 (i.e., the difference obtained by subtracting the excess D from the right torque-difference maintaining torques $TR_K$), and the output torque TL from the left motor 2L of the turning inner wheel is set to the sum of the left torque-difference maintaining torques $TL_K$ and the excess D.

In Step S150, the motors 2L and 2R are controlled through instruction for the output of the output torques TL and TR set in Steps S100 to S140. In Step S160, the ECU 10 is determined whether to be turned on or off. If determined to be on, the process returns to Step S10. If determined to be off, the process ends.

1-4. Advantageous Effects

The driving-force controller described above controls the motors 2 through the determination of priorities of the demand torque mode that generates the demand torque Tr and the torque difference mode that generates the torque difference $\Delta T$, depending on the driving operation of the driver. Such control can improve the cornering performance of the vehicle 1 while achieving the driver's request (the demand torque Tr and the total output of the motors 2).

In particular, the driving-force controller described above can appropriately interpret the driver's intention through the determination of the priorities of the two control modes depending on the stepping acceleration $\alpha$ of the accelerator pedal 9 and can carry out control suitable for the driver's intention.

Specifically, the driving-force controller described above increases the priority of the demand torque mode as the stepping acceleration $\alpha$ becomes larger. High stepping acceleration $\alpha$ during cornering can be interpreted as the intent (strong degree of acceleration requirement) of the driver to change the traveling direction of the vehicle 1 during acceleration (i.e., an increase in the driving force). Thus, the acceleration request of the driver can be achieved by increasing the priority of the generation of the output required by the driver as the stepping acceleration $\alpha$ increases.

The driving-force controller described above increases the priority of the torque difference mode as the stepping acceleration $\alpha$ becomes smaller. Low stepping acceleration $\alpha$ during cornering can be interpreted as the intent of the driver to pass through a curve at the current vehicle speed (weak degree of acceleration requirement). Thus, the stability during cornering can be increased and the cornering performance can be improved by increasing the priority of the generation of the torque difference $\Delta T$ as the stepping acceleration $\alpha$ decreases.

The driving-force controller described above selects the demand torque mode with the priority of 100% when the stepping acceleration $\alpha$ is equal to or larger than the predetermined value $\alpha_0$ during cornering and selects the torque difference mode with the priority of 100% when the stepping acceleration $\alpha$ is smaller than the predetermined value $\alpha_0$ during cornering. That is, the switching between the two control modes on the basis of the predetermined value $\alpha_0$ as a threshold can simplify the control configuration.

The driving-force controller described above sets the output torque from the motor 2 of the turning outer wheel to the maximum output torque $T_{MAX}$ of the motors 2 and determines the output torque from the motor 2 of the turning inner wheel depending on the priorities of the control modes. This achieves the driver's request and improves the cornering performance. For example, if the demand torque mode is selected between the two control modes depending on the stepping acceleration $\alpha$ as in this embodiment, the motors 2L and 2R generate the demand torque Tr while approximating, as much as possible, the difference between the output torques TL and TR to the torque difference $\Delta T$. If the torque difference mode is selected, the torque difference $\Delta T$ between the output torques TL and TR is maintained while the total torque Tt is approximated as much as possible to the demand torque Tr.

2. Second Embodiment

2-1. Configuration

A driving-force controller for an electric vehicle according to a second embodiment will now be described with reference to FIGS. 1 to 3 and FIGS. 5 to 7. The driving-force controller according to this embodiment is applied to the vehicle 1 illustrated in FIG. 1 and includes the functional components illustrated in FIG. 2 in the ECU 10.

The driving-force controller according to this embodiment carries out driving-force control different from that according to the first embodiment. The control according to this embodiment is different from that of the first embodiment in the output characteristics of the motors 2 and the calculation method carried out by the indication-torque calculator 11d of the ECU 10. The configurations that differ from the first embodiment will now be described.

The driving-force control according to this embodiment determines the priorities of the two control modes using a map (an upper limit torque difference map) previously setting therein a relationship between the driving operation by the driver and the torque difference that can be generated during cornering (the torque difference being generatable during cornering). That is, the priorities according to this embodiment are set to values between 0% and 100% depending on the driving operation of the driver so that the two control modes are carried out in appropriate proportions, instead of determining the priorities of the two control modes to either 0% or 100% depending on the driving operation by the driver.

Specifically, the priority of "the rate of the actual target output (torque instruction value) to the output required by the driver" may be determined higher than the priority of "the rate of the actual torque difference of the left and right wheels to the torque difference $\Delta T$ optimal for the cornering", or vice versa. Alternatively, equal priorities may be determined to both rates. In this embodiment, the stepping acceleration $\alpha$ (degree of acceleration requirement) of the accelerator pedal 9 during cornering is used as the driving operation by the driver in the determination of the priorities. The steering angle $\theta$ is used the determination of the turning direction.

Figure 5:
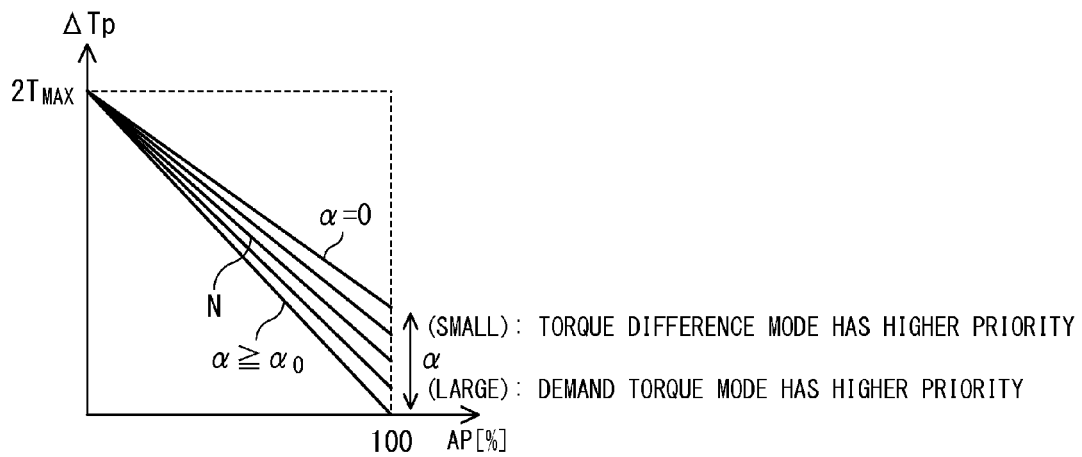
FIG. 5 is an example map for setting the upper limit torque difference of the driving-force controller according to a second embodiment.

FIG. 5 illustrates the upper limit torque difference map used in this embodiment. FIG. 5 is a map illustrating the upper-limit torque difference $\Delta Tp$ against the accelerator position AP during cornering. The upper-limit torque difference $\Delta Tp$ linearly decreases with an increase in the accelerator position AP. The upper-limit torque difference $\Delta Tp$ means the upper limit of the difference between the torques TL and TR output from the motors 2L and 2R. That is, if the ideal torque difference calculated by the torque-difference calculator 11b (referred to as an ideal torque difference $\Delta Ti$ in this embodiment) is more than or equal to the upper-limit torque difference $\Delta Tp$, the torque difference $\Delta T$ applied to the rear wheels 4L and 4R is clipped at the upper-limit torque difference $\Delta Tp$. In contrast, if the ideal torque difference $\Delta Ti$ is less than the upper-limit torque difference $\Delta Tp$, the torque difference $\Delta T$ applied to the rear wheels 4L and 4R equals the ideal torque difference $\Delta Ti$.

The motors 2L and 2R according to this embodiment have identical output characteristics and can operate in a powered mode and a regenerative mode, as in the first embodiment. Thus, if one of the motors 2 operates in the powered mode at a maximum output torque $T_{MAX}$ and the other motor 2 operates in the regenerative mode at the maximum output torque $T_{MAX}$, the torque difference that can be generated is twice the maximum output torque $T_{MAX}$. The output torque (driving force) at this time is zero. With reference to FIG. 5, the upper-limit torque difference $\Delta Tp$ is set to twice the maximum output torque $T_{MAX}$ at an accelerator position AP of 0% (achievable torque difference). Since when the accelerator position AP is 100% the demand torque Tr is large, the output torques TL and TR from the respective motors 2L and 2R are large. Thus, the upper-limit torque difference $\Delta Tp$ is minimized at the accelerator position AP of 100%. This minimum is set to different values depending on the stepping acceleration $\alpha$.

With reference to FIG. 5, the upper-limit torque difference $\Delta Tp$ against the accelerator position AP is set to vary depending on the stepping acceleration $\alpha$. In this embodiment, at a constant accelerator position AP, the upper-limit torque difference $\Delta Tp$ is set to minimize at the stepping acceleration $\alpha$ being equal to or larger than the predetermined value $\alpha_0$ ($\alpha \geq \alpha_0$), is set to increase as the stepping acceleration $\alpha$ decreases, and is set to maximize at the stepping acceleration $\alpha$ of zero ($\alpha=0$). The predetermined value $\alpha_0$ is identical to that according to the first embodiment. The minimum of the upper-limit torque difference $\Delta Tp$ at the accelerator position AP of 100% is set to increase as the stepping acceleration $\alpha$ decreases. The reduction in the upper-limit torque difference $\Delta Tp$ relative to the increase in the accelerator position AP (i.e., the variation in the upper-limit torque difference $\Delta Tp$) is set to increase as the stepping acceleration $\alpha$ decreases.

The graph illustrating the upper-limit torque difference $\Delta Tp$ at the stepping acceleration $\alpha$ being equal to or larger than the predetermined value $\alpha_0$ represents the difference between the output torques TL and TR from the motors 2L and 2R with the output torques TL and TR set such that the total torque Tt equals the demand torque Tr. That is, the graph illustrates the torque difference that can be generated (achievable torque difference) at the maximum output torque $T_{MAX}$ at the accelerator position AP of 100%, without limitation on outputs from the motors 2. The graph illustrating the upper-limit torque difference $\Delta Tp$ at the stepping acceleration $\alpha$ of zero is set to be larger than the maximum ideal torque difference $\Delta Ti$ that can be calculated by the torque-difference calculator 11b.

As a result, the smaller the stepping acceleration $\alpha$ is, the larger the upper-limit torque difference $\Delta Tp$ is, even at a constant accelerator position AP. Thus, the smaller the stepping acceleration $\alpha$ is, the lower the possibility of the clipping of the calculated ideal torque difference $\Delta Ti$ at the upper-limit torque difference $\Delta Tp$ is. Thus, the priority is determined to the generation of the torque difference $\Delta T$ approximating the ideal torque difference $\Delta Ti$ at the rear wheels 4L and 4R rather than the increase of the output torques TL and TR to approximate the demand torque Tr. In other words, as the stepping acceleration $\alpha$ decreases, the priority of the torque difference mode increases and the priority of the demand torque mode decreases. At zero stepping acceleration $\alpha$, the graph with the smallest variation is selected, and the output torques TL and TR are set to maintain the ideal torque difference $\Delta Ti$. Thus, at zero stepping acceleration $\alpha$, the torque difference mode is determined the priority of 100%.

In contrast, the larger the stepping acceleration $\alpha$ is, the smaller the upper-limit torque difference $\Delta Tp$ is, even at a constant accelerator position AP. Thus, the larger stepping acceleration $\alpha$ is, the higher possibility of the clipping of the calculated ideal torque difference $\Delta Ti$ at the upper-limit torque difference $\Delta Tp$ is. Thus, the priority is determined to the increase of the output torques TL and TR to approximate the demand torque Tr rather than the generation of the torque difference ΔT approximating the ideal torque difference ΔTi at the rear wheels 4L and 4R. In other words, as the stepping acceleration α increases, the priority of the demand torque mode increases and the priority of the torque difference mode decreases. At the stepping acceleration α being equal to or larger than the predetermined value $α_0$, the graph with the largest variation is selected, and the output torques TL and TR are set such that the total torque Tt equals the demand torque Tr and then the upper-limit torque difference ΔTp is applied. Thus, at the stepping acceleration α being equal to or larger than the predetermined value $α_0$, the demand torque mode is determined the priority of 100%.

Figure 6:
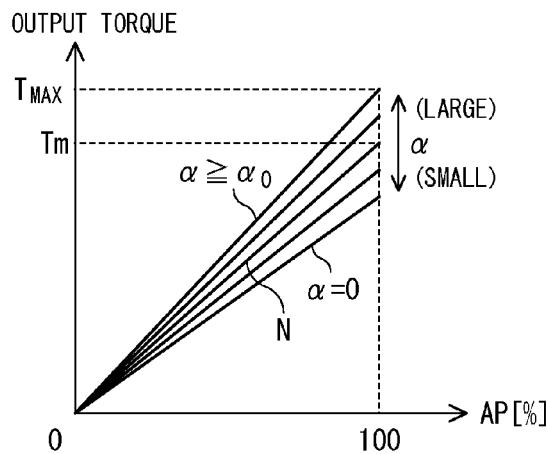
FIG. 6 is an example map illustrating the output characteristics of motors of the driving-force controller according to the second embodiment.

For the generation of the upper-limit torque difference ΔTp illustrated in FIG. 5, the output characteristics of the motors 2 according to this embodiment are set to vary depending on the accelerator position AP and the stepping acceleration α, as illustrated in FIG. 6. As illustrated in the output characteristics map in FIG. 6, the output torque linearly increases with an increase in the accelerator position AP. The output torque is set to zero for the accelerator position AP of 0%, whereas the output torque is set to maximize at the accelerator position AP of 100%. The maximum value is set to different values depending on the stepping acceleration α.

With reference to FIG. 6, the output torque against the accelerator position AP sets to vary depending on the stepping acceleration α. The output torque at the accelerator position AP of 100% (i.e., the maximum value of the output torque) is set to the maximum output torque $T_{MAX}$ of the motors 2 at the stepping acceleration α being equal to or larger than the predetermined value $α_0$. The maximum value of the output torque is set to a smaller value for lower stepping acceleration α. That is, the maximum output torque of the motors 2 according to this embodiment is set to a value smaller than the maximum output torque $T_{MAX}$ of the motors 2 as the stepping acceleration α becomes smaller than the predetermined value $α_0$, and the torque has a margin even at an accelerator position AP of 100%. In other words, the outputs of the motors 2 are more limited as the stepping acceleration α decreases. This generates the upper-limit torque difference ΔTp illustrated in FIG. 5.

FIGS. 5 and 6 are maps that illustrates three graphs between the graphs for α=0 and α≥$α_0$. Many graphs are provided between the graphs for α=0 and α≥$α_0$ and the graph corresponding to the stepping operation acceleration α is selected. FIGS. 5 and 6 illustrate two-dimensional maps. Alternatively, the stepping operation acceleration α may be added to create a three-dimensional map.

The calculator 11 of the ECU 10 will now be described. The calculation method carried out by the demand-torque calculator 11a, the torque-difference calculator 11b, and the torque-difference-maintaining-torque calculator 11c are the same as those according to the first embodiment. The torque-difference calculator 11b according to this embodiment sends the calculated torque difference as the ideal torque difference ΔTi to the torque-difference-maintaining-torque calculator 11c. The torque-difference-maintaining-torque calculator 11c replaces the torque differences ΔT in Expressions (1a) and (1b) with the ideal torque differences ΔTi sent from the torque-difference calculator 11b to calculate the torque-difference maintaining torques $TL_K$ and $TR_K$.

The indication-torque calculator 11d, as in the first embodiment, calculates and sets the output torques TL and TR (torque instruction values) instructing the motors 2L and 2R and sends the output torques TL and TR to the controller 12. In this embodiment, the indication-torque calculator 11d calculates the output torques TL and TR using the maps illustrated in FIGS. 5 and 6.

The indication-torque calculator 11d applies the stepping acceleration α during cornering to the output characteristics map in FIG. 6, selects the graph corresponding to the stepping acceleration α, and acquires the maximum output torque of the graph (the maximum output torque corresponding to the stepping acceleration α). In this way, the upper-limit torque difference ΔTp corresponding to the stepping acceleration α can be generated even at the accelerator position AP of 100%. That is, the output torques of the motors 2 have margins to secure the upper-limit torque difference ΔTp corresponding to the stepping acceleration α. Hereinafter, N denotes the graph corresponding to the stepping acceleration α, and Tm denotes the maximum output torque of the graph N. Although FIGS. 5 and 6 illustrate an example graph N and FIG. 5 illustrates an example maximum output torque Tm, the graph N and the maximum output torque Tm should not be limited to those illustrated in the drawings.

The indication-torque calculator 11d compares the torque-difference maintaining torque $Tout_K$ of the turning outer wheel calculated by the torque-difference-maintaining-torque calculator 11c with the acquired maximum output torque Tm of the motors 2. If the torque-difference maintaining torque $Tout_K$ of the turning outer wheel is less than or equal to the maximum output torque Tm, the torque-difference maintaining torques $TL_K$ and $TR_K$ can be generated by the respective motors 2L and 2R. In this case, the demand torque Tr can be achieved with the ideal torque difference ΔTi generated by the motors 2L and 2R. Thus, the indication-torque calculator 11d sets the respective output torques TL and TR to the torque-difference maintaining torques $TL_K$ and $TR_K$ (TL=$TL_K$, TR=$TR_K$).

If the torque-difference maintaining torque $Tout_K$ of the turning outer wheel exceeds the maximum output torque Tm, the torque $Tout_K$ cannot be generated by the motors 2. Thus, the indication-torque calculator 11d determines the priorities of the demand torque mode and the torque difference mode depending on the stepping acceleration α. Specifically, the indication-torque calculator 11d acquires the upper-limit torque difference ΔTp corresponding to the priorities of the two control modes through the application of the stepping acceleration α and the accelerator position AP to the map in FIG. 5. The indication-torque calculator 11d compares the acquired upper-limit torque difference ΔTp with the ideal torque difference ΔTi calculated by the torque-difference calculator 11b.

If the ideal torque difference ΔTi is more than or equal to the upper-limit torque difference ΔTp, the indication-torque calculator 11d clips the torque difference ΔT at the upper-limit torque difference ΔTp (ΔT=ΔTp). That is, the demand torque mode is determined the priority higher than the priority determined to the torque difference mode. If the ideal torque difference ΔTi is less than the upper-limit torque difference ΔTp, the indication-torque calculator 11d sets the torque difference ΔT to the ideal torque difference ΔTi (ΔT=ΔTi). That is, the torque difference mode is determined the priority higher than the priority of the demand torque mode.

The indication-torque calculator 11d determines the turning direction based on positive and negative of the steering angle θ and sets the output torque from the motor 2 of the turning outer wheel to the acquired maximum output torque Tm. The indication-torque calculator 11d sets the output torque from the motor 2 of the turning inner wheel to the difference obtained by subtracting the torque difference ΔT from the acquired maximum output torque Tm. The torque difference ΔT is set on the basis of the priorities determined depending on the stepping acceleration α. Thus, setting the output torque of the turning inner wheel in this way can supply the output torques TL and TR corresponding to the priorities of the two control modes to the respective rear wheels 4L and 4R.

Specific examples of the setting of the output torque of the turning inner wheel will now be described. For example, if the stepping acceleration α during cornering is zero, the indication-torque calculator 11d selects the graphs having the smallest variation in the maps in FIGS. 5 and 6. The upper-limit torque difference ΔTp acquired from FIG. 5 is larger than the ideal torque difference ΔTi calculated by the torque-difference calculator 11b regardless of the accelerator position AP. Thus, the indication-torque calculator 11d sets the torque difference ΔT to the ideal torque difference ΔTi. As a result, the output torque of the turning inner wheel is set to the difference obtained by subtracting the torque difference ΔT (ideal torque difference ΔTi) from the output torque of the turning outer wheel (i.e., the maximum output torque corresponding to the current stepping acceleration α (α=0)). Thus, the ideal torque difference ΔTi calculated by the torque-difference calculator 11b is secured, and the torque difference mode is determined the priority of 100%.

If the stepping acceleration α during cornering equals $α_0$, the indication-torque calculator 11d selects the graphs having the largest variation in the maps in FIGS. 5 and 6. The upper-limit torque difference ΔTp acquired from FIG. 5 is smaller than the ideal torque difference ΔTi calculated by the torque-difference calculator 11b depending on the accelerator position AP. Thus, if the ideal torque difference ΔTi is more than or equal to the upper-limit torque difference ΔTp, the indication-torque calculator 11d sets the torque difference ΔT to the upper-limit torque difference ΔTp. As a result, the output torque of the turning inner wheel is set to the difference obtained by subtracting the torque difference ΔT (upper-limit torque difference ΔTp) from the output torque of the turning outer wheel (i.e., the maximum output torque $T_{MAX}$ corresponding to the current stepping acceleration α ($α=α_0$)). Thus, the demand torque Tr is secured, and the demand torque mode is determined the priority of 100%.

If the steering angle θ detected by the steering angle sensor 15 is less than or equal to the predetermined value $θ_0$, the indication-torque calculator 11d determines a non-cornering mode, as in the first embodiment, and sets the output torques TL and TR to half of the demand torque Tr (TL=TR=Tr/2).

2-2. Flow Chart

Figure 7:
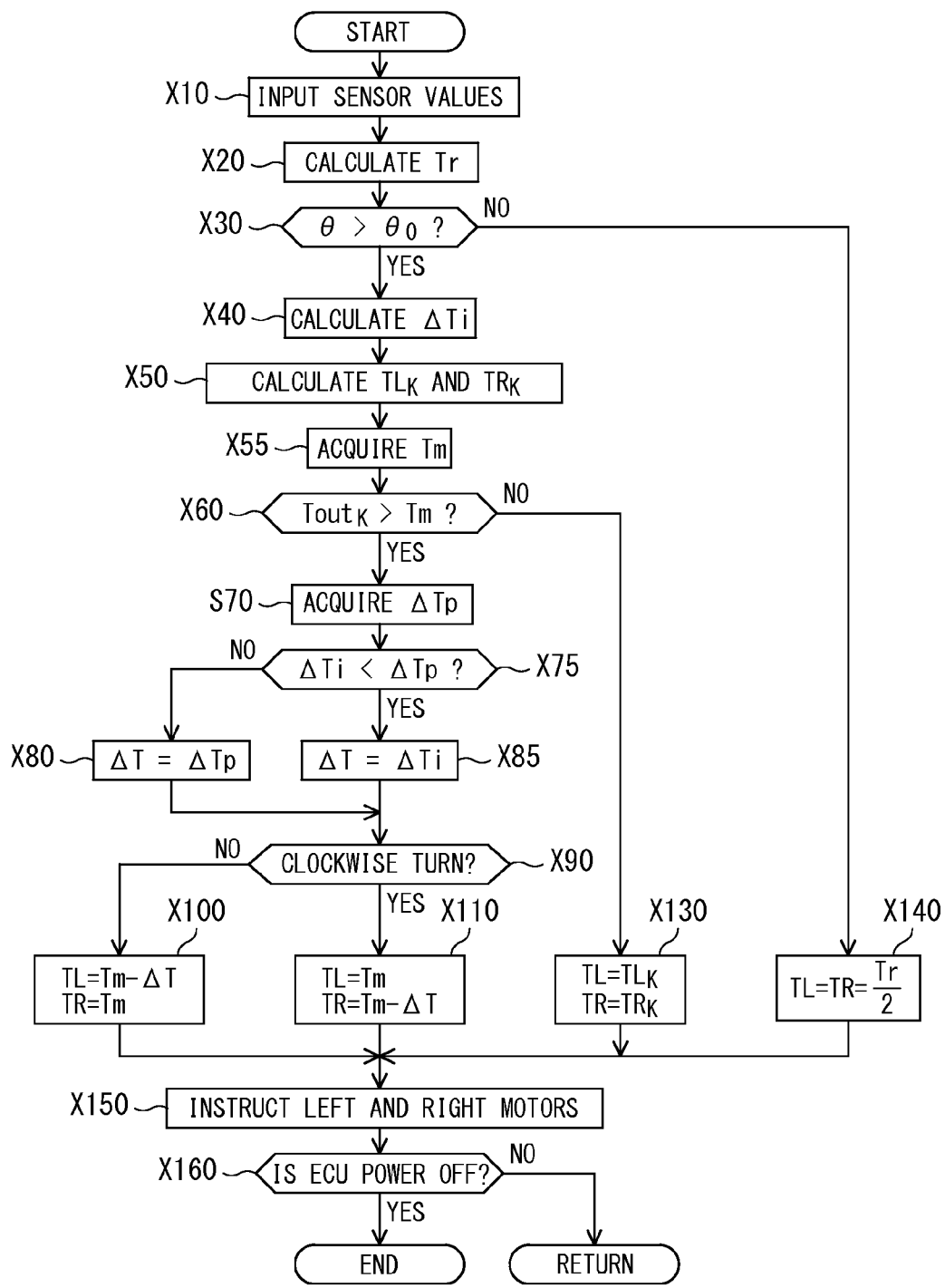
FIG. 7 is a flow chart illustrating the control process carried out by the driving-force controller according to the second embodiment.

FIG. 7 is a flow chart illustrating the process of driving-force control according to this embodiment. The process in the flow chart is repeated at a predetermined calculation cycle while the ECU 10 is turned on.

With reference to FIG. 7, in Step X10, the data items detected by the sensors 13 to 16 are input to the ECU 10. In Step X20, the demand-torque calculator 11a calculates the demand torque Tr.

In Step X30, the steering angle θ is determined whether to be larger than the predetermined value $θ_0$. If θ≤$θ_0$, the process goes to Step X140. In Step X140, the indication-torque calculator 11d sets each of the output torques TL and TR to half of the demand torque Tr. If θ>$θ_0$, the torque-difference calculator 11b calculates the ideal torque difference ΔTi in Step X40. In Step X50, the torque-difference-maintaining-torque calculator 11c calculates the torque-difference maintaining torques $TL_K$ and $TR_K$.

Step X55 and the subsequent steps are performed by the indication-torque calculator 11d. In Step X55, the stepping acceleration α calculated from the accelerator position AP is applied to the map of output characteristics in FIG. 6 to acquire the maximum output torque Tm corresponding to the stepping acceleration α. In Step X60, the torque-difference maintaining torque $Tout_K$ of the turning outer wheel is determined whether to be larger than the maximum output torque Tm acquired in Step X55.

If $Tout_K$≤Tm, the torque-difference maintaining torques $TL_K$ and $TR_K$ can both be generated. Thus, the process goes to Step X130 to set the respective output torques TL and TR to the torque-difference maintaining torques $TL_K$ and $TR_K$ calculated in Step X50.

If $Tout_K$>Tm, the stepping acceleration α and the accelerator position AP are applied to the map in FIG. 5 in Step X70 so as to acquire the upper-limit torque difference ΔTp corresponding to the stepping acceleration α and the accelerator position AP. In Step X75, the ideal torque difference ΔTi calculated in Step X40 is determined whether to be smaller than the upper-limit torque difference ΔTp acquired in Step X70. If ΔTi≥ΔTp, the torque difference ΔT is set to the upper-limit torque difference ΔTp in Step X80. If ΔTi<ΔTp, the torque difference ΔT is set to the ideal torque difference ΔTi in Step X85. In this way, the torque difference ΔT is set depending on the stepping acceleration α.

In Step X90, the turning is determined whether to be clockwise turning. If in the clockwise turning, in Step X110, the output torque TL from the left motor 2L of the turning outer wheel is set to the maximum output torque Tm acquired in Step X55, and the output torque TR from the right motor 2R of the turning inner wheel is set to the difference obtained by subtracting the torque difference ΔT set in Step X80 or X85 from the maximum output torque Tm acquired in Step X55. If in the counterclockwise turning, in Step X100, the output torque TR from the right motor 2R of the turning outer wheel is set to the maximum output torque Tm acquired in Step X55, and the output torque TL from the left motor 2L of the turning inner wheel is set to the difference obtained by subtracting the torque difference ΔT set in Step X80 or X85 from the maximum output torque Tm acquired in Step X55.

In Step X150, the motors 2L and 2R are controlled through instruction for the output of the output torques TL and TR set in Steps X100 to X140. In Step X160, the ECU 10 is determined whether to be turned on or off. If determined to be on, the process returns to Step X10. If determined to be off, the process ends.

2-3. Advantageous Effects

The driving-force controller according to this embodiment determines the priorities of the two control modes using the map (the upper limit torque difference map) previously setting therein the relationship between the driving operation by the driver and the torque difference that can be generated during cornering (the torque difference being generatable during cornering). Thus, the priorities can be determined with appropriate proportions to carry out control suitable for the intent of the driver. The components that are the same as those in the first embodiment achieve the same advantages as those in the first embodiment.

3. Others

The present invention should not be limited to the embodiments described above and may be modified in various ways within the scope of the embodiments.

In the first embodiment, when the output torque $Tout_K$ of the turning outer wheel exceeds the maximum output torque $T_{MAX}$ of the motors 2, the output torques TL and TR may be set in any manner other than that described above. For example, in the demand torque mode having the priority of 100%, the output torque from the motor 2 of the turning outer wheel may be set to a value smaller than the maximum output torque $T_{MAX}$ to determine priority of only the generation of the demand torque Tr by the motors 2L and 2R, without the torque difference ΔT.

That is, in any of the embodiments described above, if the priority of the demand torque mode is higher than the priority of the torque difference mode, the output torques TL and TR may be set to determine priority of the generation of a total torque Tt approximating the demand torque Tr rather than the generation of the torque difference ΔT, whereas if the priority of the torque difference mode is higher than the priority of the demand torque mode, the output torques TL and TR may be set such that priority is determined to the generation of a torque difference approximating the torque difference ΔT rather than the generation of the total torque Tt approximating the demand torque Tr.

Figure 8A:
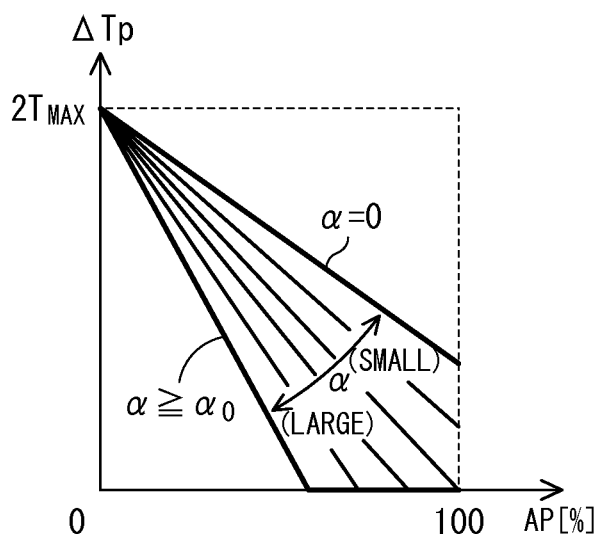
FIGS. 8A and 8B are example maps for setting the upper limit torque difference in the driving-force controller according to modifications.
Figure 8B:
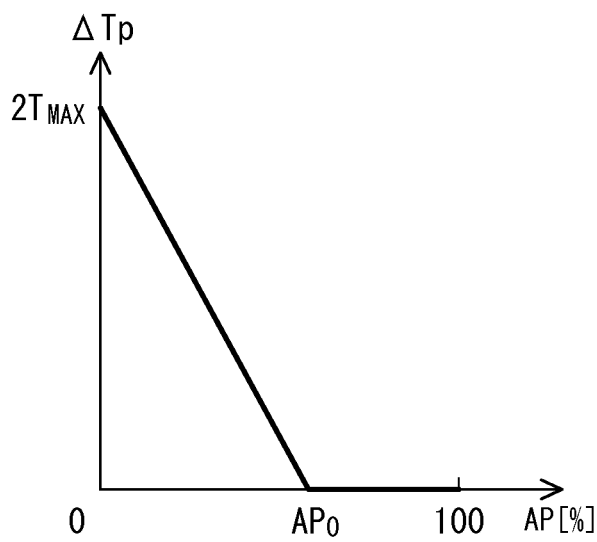

Any map other than that described above can be used for the calculation of the torque difference ΔT depending on the priorities (FIG. 5) in the second embodiment. FIGS. 8A and 8B illustrate modifications of the map in FIG. 5. FIG. 8A illustrates a map that sets the upper-limit torque difference ΔTp to zero in a relatively wide range of the accelerator position AP at stepping acceleration α being equal to or larger than the predetermined value $α_0$ or approximating the predetermined value $α_0$. The map in FIG. 8A sets a smaller upper-limit torque difference ΔTp at any stepping acceleration α compared with the map in FIG. 5. That is, the map in FIG. 8A determines higher priority of the demand torque mode.

FIG. 8B illustrates a map that changes from the stepping acceleration α to the accelerator position AP as the driving operation by the driver. In this map, the upper-limit torque difference ΔTp decreases with the increase of the accelerator position AP and is constantly set to zero at any accelerator position AP being equal to or larger than a predetermined value $AP_0$. When the map in FIG. 8B is used, the upper-limit torque difference ΔTp is smaller than the ideal torque difference ΔTi, and the demand torque mode is determined the priority of 100% at the accelerator position AP equal to or larger than the predetermined value $AP_0$. A smaller accelerator position AP generates a larger upper-limit torque difference ΔTp. Thus, if the ideal torque difference ΔTi is less than the upper-limit torque difference ΔTp, the ideal torque difference ΔTi is determined to the torque difference ΔT, and the torque difference mode is determined the priority of 100%. The motors 2 may be controlled through the determination of priorities of the two control modes depending on the accelerator position AP.

The torque difference ΔT applied to the left and right wheels may be set directly in a map including a predetermined torque difference ΔT depending on the priorities of the two control modes, rather than the map defining the upper limit of the torque difference ΔTp as in the FIGS. 5, 8A, and 8B.

In the embodiments described above, the stepping acceleration α of the accelerator pedal 9 (a second-order time differentiation value of the accelerator position AP) is used as the degree of acceleration requirement of the driver. Any other degree of acceleration requirement may also be employed. For example, an accelerator opening speed (a stepping rate of the accelerator pedal 9), which is a time differentiation value of the accelerator position AP, may be used in place of the stepping acceleration α in the embodiments described above. The accelerator opening speed increases as the degree of acceleration requirement of the driver increases. The accelerator opening speed decreases as the degree of acceleration requirement of the driver decreases. Thus, even with the use of the accelerator opening speed in place of the stepping acceleration α, the same advantageous effects as those described above can be achieved.

The demand-torque calculator 11a may carry out any calculation method to determine the demand torque Tr, such as a calculation method using expressions in place of maps. The torque-difference calculator 11b may also carry out any calculation method other than those described above. For example, the torque difference ΔT may be calculated using other parameters or may be directly determined on the map. In the embodiments described above, the accelerator position sensor 16 detects the accelerator position AP to calculate the stepping acceleration α. Alternatively, sensors may be provided to directly detect the stepping acceleration α and/or the accelerator opening speed.

The vehicle 1 may be any electric vehicle that includes at least two motors that can independently drive the left and right wheels. For example, the electric vehicle may be a four-wheel-drive vehicle or may be a hybrid vehicle including an engine.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 1 electric car, vehicle (electric vehicle)
2, 2L, 2R motor
4, 4L, 4R rear wheels (left and right wheels)
9 accelerator pedal
10 ECU (controller)
11 calculator
11a demand-torque calculator
11b torque-difference calculator
11c torque-difference-maintaining-torque calculator
11d indication-torque calculator
12 controller
15 steering angle sensor (detector)
16 accelerator position sensor (detector)
Tr demand torque
ΔT torque difference
α stepping acceleration (degree of acceleration requirement)
$α_0$ predetermined value
$TL_K$, $TR_K$ left and right torque-difference maintaining torques

The invention claimed is:

1. A driving-force controller for an electric vehicle comprising at least two motors that independently drive left and right wheels, the driving-force controller comprising:
   a detector that detects driving operation by a driver; and
   a controller that calculates a demand torque of the driver and a torque difference applied to the left and right wheels during cornering, calculates left and right torque-difference maintaining torques of the motors when generating the demand torque while maintaining the torque difference, and controls the motors based on the torque-difference maintaining torques, wherein
   the controller determines priorities of a demand torque mode that generates the demand torque and a torque difference mode that generates the torque difference, depending on the driving operation detected by the detector.

2. The driving-force controller according to claim 1, wherein,
the detector comprises an accelerator position sensor that detects the stepping operation of an acceleration pedal as the driving operation, and
the controller acquires a degree of acceleration requirement of the driver based on the stepping operation of the accelerator pedal detected by the accelerator position sensor and determines the priorities depending on the degree of acceleration requirement.

3. The driving-force controller according to claim 2, wherein the controller increases the priority of the demand torque mode as the degree of acceleration requirement becomes larger during cornering.

4. The driving-force controller according to claim 2, wherein the controller increases the priority of the torque difference mode as the degree of acceleration requirement becomes smaller during cornering.

5. The driving-force controller according to claim 2, wherein the controller selects the demand torque mode when the degree of acceleration requirement is equal to or larger than a predetermined value during cornering and selects the torque difference mode when the degree of acceleration requirement is smaller than the predetermined value during cornering.

6. The driving-force controller according to claim 1, wherein the controller determines the priorities using a map previously setting therein a relationship between the driving operation by the driver and the torque difference of the left and right wheels, the torque difference being generatable during cornering.

7. The driving-force controller according to claim 1, wherein the controller determines the priorities depending on the driving operation detected by the detector when a torque of the turning outer wheel, being one of the left and right torque-difference maintaining torques, exceeds a maximum output torque of the motors.

8. The driving-force controller according to claim 1, wherein the controller sets an output torque from one of the motors of the turning outer wheel to a maximum output torque of the motors and determines an output torque from the other one of the motors of the turning inner wheel depending on the priorities, when a torque of the turning outer wheel, being one of the left and right torque-difference maintaining torques, exceeds the maximum output torque.

9. The driving-force controller according to claim 1, wherein,
the detector comprises an accelerator position sensor that detects the stepping operation of an acceleration pedal as the driving operation, and
the controller determines the priorities depending on the stepping operation acceleration of the acceleration pedal detected by the accelerator position sensor.

* * * * *